(12) United States Patent
Tussing

(10) Patent No.: US 9,579,782 B2
(45) Date of Patent: Feb. 28, 2017

(54) TOOL ATTACHMENT FOR A HAND-HELD MACHINE TOOL

(71) Applicant: Robert Bosch GmbH, Stuttgart (DE)

(72) Inventor: Torsten Tussing, Koengen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 172 days.

(21) Appl. No.: 14/074,991

(22) Filed: Nov. 8, 2013

(65) Prior Publication Data

US 2014/0131959 A1 May 15, 2014

(30) Foreign Application Priority Data

Nov. 15, 2012 (DE) .......................... 10 2012 220 915
Jul. 15, 2013 (DE) .......................... 10 2013 213 814

(51) Int. Cl.
*B23B 31/02* (2006.01)
*B25F 3/00* (2006.01)
*B23B 45/00* (2006.01)

(52) U.S. Cl.
CPC ................ *B25F 3/00* (2013.01); *B23B 31/02* (2013.01); *B23B 45/003* (2013.01); *Y10T 279/34* (2015.01); *Y10T 279/3406* (2015.01)

(58) Field of Classification Search
CPC ......... B23B 45/003; B23B 31/02; B25F 3/00; B25B 21/007; B25B 23/0035; Y10T 279/26; Y10T 279/3406; Y10T 279/34
USPC ......... 408/238, 239 R, 239 A, 240; 279/133, 279/142–145; 30/500; 7/158, 165
See application file for complete search history.

(56) References Cited

U.S. PATENT DOCUMENTS

| | | | | | |
|---|---|---|---|---|---|
| 5,466,101 | A | * | 11/1995 | Meyen ......................... | 408/226 |
| 6,079,716 | A | * | 6/2000 | Harman et al. ................. | 279/75 |
| 6,688,611 | B2 | * | 2/2004 | Gifford et al. .................. | 279/71 |
| 6,691,799 | B2 | * | 2/2004 | Kuhnle et al. ................ | 173/132 |
| 2001/0026051 | A1 | * | 10/2001 | Gifford et al. ............... | 279/19.6 |
| 2004/0056435 | A1 | * | 3/2004 | Bedi et al. ....................... | 279/75 |
| 2010/0008739 | A1 | * | 1/2010 | Chiang ......................... | 408/209 |
| 2013/0161044 | A1 | * | 6/2013 | Hecht et al. .................... | 173/90 |

FOREIGN PATENT DOCUMENTS

| | | | | | |
|---|---|---|---|---|---|
| DE | | 1628079 | A1 * | 6/1971 | ............... B25F 3/00 |
| DE | | 10125418 | A1 * | 12/2002 | ............... B25F 3/00 |
| DE | | 102004006205 | B3 * | 5/2005 | ........... B25B 21/007 |
| DE | 20 2006 014 850 | | | 11/2006 | |
| EP | | 0199842 | A1 * | 11/1986 | ........... B23B 45/003 |

\* cited by examiner

*Primary Examiner* — Sunil K Singh
*Assistant Examiner* — Ryan Rufo
(74) *Attorney, Agent, or Firm* — Gerard Messina

(57) ABSTRACT

A tool attachment has: (i) a drive shaft driven rotationally; (ii) a locking section for locking on a mounting interface of a hand-held machine tool, the machine tool including a tool holder having a receiving member for receiving an insert tool and a first locking sleeve preloaded by a first spring element in an axial direction pointing away from the hand-held machine tool; and (iii) an actuating element configured to shift, upon mounting the tool attachment on the hand-held machine tool, the first locking sleeve against a spring force applied by the first spring element, in the direction of the hand-held machine tool.

35 Claims, 9 Drawing Sheets

TOOL ATTACHMENT FOR A HAND-HELD MACHINE TOOL

BACKGROUND OF THE INVENTION

1. Field of the Invention

The present invention relates to a tool attachment having a drive shaft able to be driven rotationally and a locking section for locking on a mounting interface of a hand-held machine tool, that has a tool holder having a receiving member for receiving an insert tool and a first locking sleeve preloaded by a first spring element in an axial direction pointing away from the hand-held machine tool.

2. Description of the Related Art

The related art describes tool attachments of this type, which are able to be locked by an assigned locking section on a mounting interface of a corresponding hand-held machine tool. In so doing, a drive shaft assigned to the tool attachment engages with a tool holder, assigned to the hand-held machine tool and provided with a spring-loaded locking sleeve, regardless of a specific position of the locking sleeve, in order to allow torque to be transferred from the tool holder to the drive shaft.

The related art has the disadvantage that in the case of such tool attachments, there must be comparatively great radial and tangential play between the drive shaft and the tool holder in order, for example, to allow the drive shaft to engage with the tool holder in its locked state.

BRIEF SUMMARY OF THE INVENTION

An object of the present invention is therefore to provide a new tool attachment for locking on a hand-held machine tool, in doing which, it being made possible to at least reduce a tangential and radial play existing between a drive shaft of the tool attachment and a tool holder of the hand-held machine tool.

This objective is achieved by a tool attachment having a drive shaft able to be driven rotationally and a locking section for locking on a mounting interface of a hand-held machine tool, that has a tool holder having a receiving member for receiving an insert tool and a first locking sleeve preloaded by a first spring element in an axial direction pointing away from the hand-held machine tool. An actuating element is provided which is designed, upon mounting the tool attachment on the hand-held machine tool, to shift the first locking sleeve against a spring force applied by the first spring element, in the direction of the hand-held machine tool.

The present invention therefore makes it possible to provide a tool attachment where, by actuating the locking sleeve of a tool holder—assigned to the hand-held machine tool—by way of an actuating element assigned to the tool attachment for mounting the tool attachment, the tool holder is able to be released, thus permitting a reduction of a tangential and radial play existing between a drive shaft of the tool attachment and a tool holder of the hand-held machine tool.

According to one specific embodiment, the actuating element embraces the drive shaft at least sectionally in sleeve-shaped fashion.

A robust and cost-effective actuating element may thus be provided.

Preferably, the drive shaft and the actuating element are formed in one piece.

Thus, an uncomplicated component may be provided for realizing the drive shaft and the actuating element, which is able to be installed quickly and easily in the tool attachment when manufacturing it.

According to one specific embodiment, the drive shaft is rotationally mounted in a base member that forms an inner hollow space and at whose outer circumference a second locking sleeve is disposed which is displaceable axially against a spring force of a second spring element in order to release at least one locking element. The second locking sleeve is preloaded by the second spring element in an axial direction that points away from the tool attachment and that, upon mounting the tool attachment on the hand-held machine tool, points in the direction of the hand-held machine tool.

The invention thus makes it possible to provide a secure and reliable locking section for the tool attachment.

Upon the mounting of the tool attachment on the hand-held machine tool, the spring forces of the first and second spring elements preferably act in mutually opposite directions.

Therefore, a tool attachment having a comparatively short overall length may be provided.

The at least one locking element preferably has at least one locking sphere engaging at least sectionally in an assigned radial opening in the base member.

Robust and cost-effective locking elements may thus be provided.

According to one specific embodiment, the actuating element is designed to permit spring loading of the tool attachment by the first spring element via the first locking sleeve in the mounted state of the tool attachment on the hand-held machine tool, in the axial direction pointing away from the hand-held machine tool.

The present invention thus makes it possible to provide a tool attachment where the spring force of the spring element assigned to the tool holder of the hand-held machine tool is used, on one hand, to assist in the axial centering of the tool attachment on the hand-held machine tool, and on the other hand, in the removal of the tool attachment from the hand-held machine tool.

Preferably, the drive shaft is able to be accommodated in the receiving member exclusively for transferring torque.

Therefore, axial centering as well as a tangentially and radially zero-play fixation of the tool attachment are accomplished exclusively without assistance of the drive shaft.

According to one specific embodiment, the tool attachment is realized in the manner of a drill-chuck adapter or an angle attachment.

Thus, a locking section for a tool attachment may be provided which is able to be used for a multitude of different tool attachments.

According to one specific embodiment, the locking section has at least one holding element, taking the form of a bayonet, for mounting and locking on the mounting interface of the hand-held machine tool in a manner protected against twisting.

Thus, the tool attachment is able to be mounted and locked safely and reliably on the hand-held machine tool in an easy manner via a bayonet joint.

The objective named at the outset is also achieved by a tool system having a hand-held machine tool and a tool attachment for mounting on the hand-held machine tool, which is provided with a tool holder that has a receiving member for accommodating an insert tool and a first locking sleeve preloaded by a first spring element in an axial direction pointing away from the hand-held machine tool.

The tool holder is assigned a mounting interface for mounting the tool attachment, which is provided with a drive shaft able to be driven rotationally, and a locking section for locking on the mounting interface. The tool attachment has an actuating element which is designed, upon mounting the tool attachment on the hand-held machine tool, to shift the first locking sleeve against a spring force applied by the first spring element, in the direction of the hand-held machine tool.

DETAILED DESCRIPTION OF THE INVENTION

Figure 1:
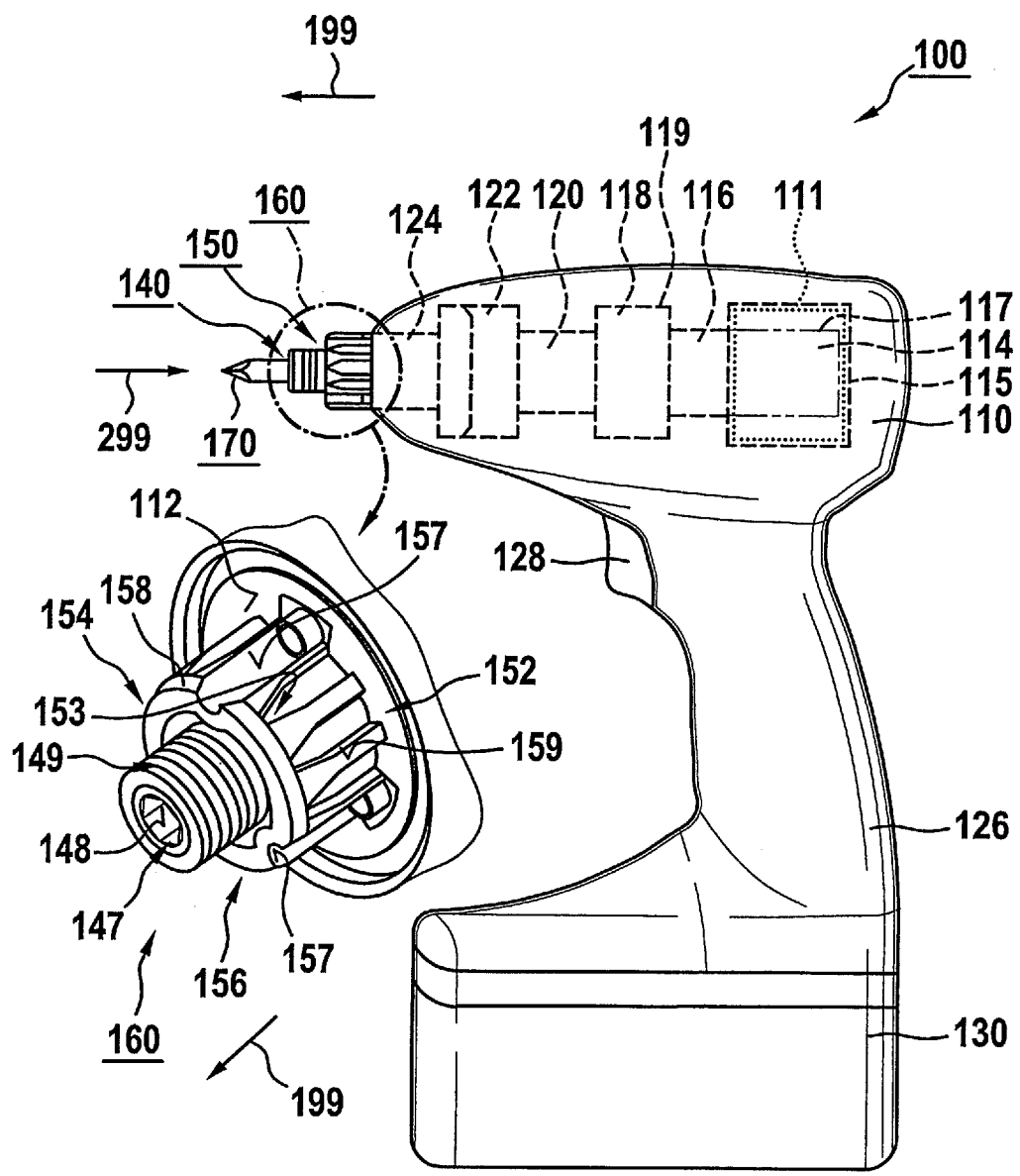
FIG. 1 shows a schematic view of a hand-held machine tool having a tool holder and a mounting interface according to one specific embodiment.

FIG. 1 shows a hand-held machine tool 100 which is provided with a tool holder 140 and has a housing 110 having a hand grip 126, as well as an enlarged cut-away portion 160 of hand-held machine tool 100. According to one specific embodiment, hand-held machine tool 100 is connectable mechanically and electrically to a battery pack 130 for the cordless power supply.

By way of example, hand-held machine tool 100 is in the form of a cordless rotary-impact screwdriver. However, it is pointed out that the present invention is not limited to cordless rotary-impact screwdrivers, but rather may be used for various hand-held machine tools which have a tool holder corresponding to tool holder 140, regardless of whether the hand-held machine tool is operable electrically, i.e., in battery-powered fashion with battery pack 130 or in mains-dependent fashion, and/or non-electrically.

Disposed in housing 110 are an electric drive motor 114, supplied with current by battery pack 130, a gear unit 118 and an optional striking mechanism 122. For example, drive motor 114 is operable, that is, is able to be switched on and off, via a manual switch 128, and preferably is able to be controlled or regulated electronically in such a way that both a reverse operation as well as setpoint selections with respect to a desired rotational speed are able to be realized.

According to one specific embodiment, drive motor 114 is an electronically commutated drive motor, preferably a direct-current motor which illustratively has stator and rotor components 111 and 117, respectively. In this context, for example, stator components 111 form an outer stator and, for instance, rotor components 117 form an inner rotor. However, it is pointed out that the description of a drive motor taking the form of an electronically commutated drive motor with outer stator and inner rotor has merely an exemplary character and is not to be understood as a limitation of the invention, which may also be used in the case of a drive motor having an inner stator and an outer rotor or, for example, for a commutator motor with brush gear.

Drive motor 114 is connected via an assigned motor shaft 116 to gear unit 118, which converts a rotation of motor shaft 116 into a rotation of a driving element 120, e.g., a drive shaft, provided between gear unit 118 and striking mechanism 122. Preferably, this conversion takes place in such a way that driving element 120 rotates with increased torque relative to motor shaft 116, but reduced rotational speed. Drive motor 114 is situated illustratively in a motor housing 115 and gear unit 118 is in a gear housing 119, gear housing 119 and motor housing 115 being disposed, e.g., in housing 110.

For example, optional striking mechanism 122, connected to driving element 120, is a rotary or rotational striking mechanism that generates rapid rotary pulses with high intensity and transfers them to a drive shaft 124, e.g., a drive spindle. An exemplary striking mechanism with which striking mechanism 122 may be realized is described in German utility model DE 20 2006 014 850 U1, to which explicit reference is made here, and whose teachings are to be understood as a part of the present specification, so that a detailed description of striking mechanism 122 may be omitted here in order to keep the specification brief.

Tool holder 140 is formed on drive shaft 124, and illustratively has a receiving member 147 having inner multi-edge receiver 148 which is provided to accommodate insert tools having external multi-edge couplings. Disposed at the periphery of receiving member 147, which is joined in rotationally fixed manner to and/or is formed in one piece with drive shaft 124, for instance, is a locking sleeve 149 which is acted upon by a spring element (220 in FIG. 3) in an axial direction 199 pointing away from hand-held machine tool 100, in order to lock suitable insert tools in inner multi-edge receiver 148.

For example, tool holder 140 is formed in the manner of a bit holder, i.e., for receiving an insert tool 170 taking the form of a screwdriver bit, which is inserted in the direction of hand-held machine tool 100, as indicated by an arrow 299, into inner multi-edge receiver 148. Such a screwdriver bit, which illustratively is of what is known as the hex type, is sufficiently familiar from the related art, so that for the purpose of keeping the specification concise, a detailed description is omitted here. However, it is pointed out that the present invention is not limited to the use of hex screwdriver bits, but rather, other insert tools, e.g., hex drill bits or what are known as SDS quick drill bits may also be used, depending on the form of tool holder 140 selected in each case. Moreover, it is pointed out that the construction and functioning method of a suitable bit holder are sufficiently familiar to one skilled in the art, so that a detailed description of bit holder 140 is omitted here in order to keep the specification brief.

According to one specific embodiment, hand-held machine tool 100 is assigned a mounting interface 150, which illustratively is secured in axially and radially immovable fashion in the area of bit holder 140 on gear housing 119 or directly on housing 110. However, it is pointed out that mounting interface 150 is formed as a separate component only by way of example, and alternatively, may also be formed in one piece with gear housing 119 or housing 110.

Mounting interface 150 is used for the mounting, especially mounting oriented in a predefined angular position, of an assigned tool attachment (200 in FIG. 2 or 500 in FIG. 5), and illustratively has an at least sectionally sleeve-shaped support element 158 which has an outer circumference 159 and is secured in a manner protected against twisting at an end face 112 of housing 110 on gear housing 119 or housing 110. This support element 158, also denoted hereinafter as "mounting sleeve", jackets bit holder 140, e.g., at least sectionally, with a predefined radial clearance in order to permit an axial shift of locking sleeve 149 of bit holder 140 in the interior of mounting sleeve 158.

At outer circumference 159 of mounting sleeve 158, illustratively a plurality of groove-like receivers 152, 154, 156, 157 are formed for receiving at least one and preferably a plurality of locking elements (232 in FIG. 2 or 5), groove-like receivers 152, 154, 156, 157 being aligned in the longitudinal direction of mounting interface 150, i.e., in direction 199 or 299. Groove-like receivers 157 are formed in such a way, for example, that they are able to receive fastening elements such as rivets or screws, for instance, for fastening mounting sleeve 158 to end face 112 of housing 110. By way of example, three groove-like receivers 152, three groove-like receivers 154 and three groove-like receivers 156, respectively, are provided, which in each case are set apart from each other by a groove-like receiver 157, so that three groove-like receivers 157 are thus also provided. However, it is pointed out that the total of twelve groove-like receivers 152, 154, 156, 157 has only an exemplary character, and is not to be understood as a restriction of the invention.

According to one specific embodiment, at least groove-like receivers 152, 154, 156 taper in axial direction 199 pointing away from hand-held machine tool 100, in order to permit axial centering of an assigned tool attachment (200 in FIG. 2 or 500 in FIG. 5) on housing 110 and/or gear housing 119 in a manner protected against twisting, as described below in connection with FIGS. 3 through 5. As illustration, each groove-like receiver 152, 154, 156 has an at least approximately V-shaped end area 153.

Figure 2:
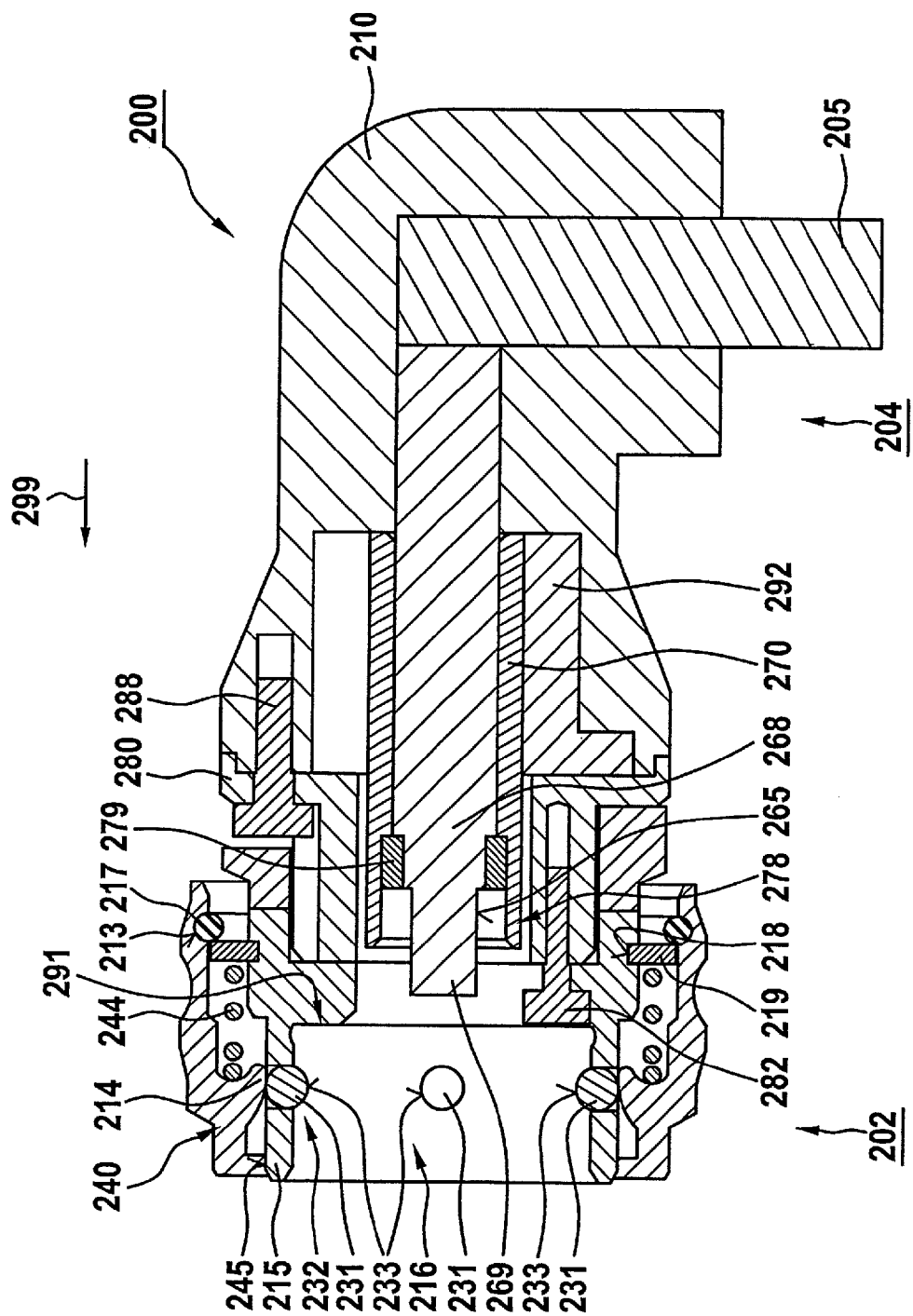
FIG. 2 shows a sectional view of a tool attachment according to a first specific embodiment.

FIG. 2 shows an exemplary tool attachment 200, which according to one specific embodiment, is designed for mounting on mounting interface 150 of hand-held machine tool 100 of FIG. 1. According to a first specific embodiment, tool attachment 200 is a type of angle attachment and, for instance, has a locking section 202 as well as a drive unit 204, also denoted hereinafter as "angle-drive section." However, it is pointed out that tool attachment 200 is formed as an angle attachment only by way of example, and not to restrict the invention. Rather, tool attachment 200 may have any form as desired, e.g., a drill-chuck adapter as described by way of example in FIG. 5, or an eccentric attachment, etc. To simplify the description, tool attachment 200 is therefore also denoted hereinafter as "angle attachment 200."

For example, angle-drive section 204 has an attachment housing 210, in which a rotationally drivable drive shaft 268 of angle attachment 200 is rotationally mounted. Drive shaft 268 is used to drive a drive shaft 205—which to this end is disposed at a predefined angle, illustratively 90°—that likewise is rotationally mounted in attachment housing 210 and, for example, may be designed to receive screwdriver bit 170 from FIG. 1. However, it is pointed out that a suitable implementation of angle-drive section 204 is sufficiently familiar from the related art, so that a detailed description of angle-drive section 204 may be omitted here in order to keep the specification concise.

In the area of a free end 269 of drive shaft 268 which faces away from angle-drive section 204 and on which a multi-edge entrainment contour 265 is formed, for example, a closure and guidance element 280 is formed, which is sleeve-shaped at least in some areas and through which drive shaft 268 reaches. This closure and guidance element 280 is fastened to attachment housing 210 via suitable fastening elements 288, e.g., screws or rivets. Moreover, drive shaft 268 is assigned an actuating element 270, provided with a free end 278, which embraces drive shaft 268 at least sectionally in sleeve-shaped manner and whose functionality is described in detail below in connection with FIGS. 3 and 4. For example, actuating element 270 is supported in a bearing sleeve 292 provided in attachment housing 210, and is secured from slipping out via free end 269 of drive shaft 268 by a retaining ring 279. Alternatively, drive shaft 268 and actuating element 270 or attachment housing 210 and actuating element 270 may also be formed in one piece.

According to one specific embodiment, drive shaft 268 is twistable relative to actuating element 270. In this case, retaining ring 279 may be formed in the manner of a plain bearing, e.g., a sintered bearing pressed into actuating element 270.

As illustration, locking section 202 has a base member 215, which is secured to closure and guidance element 280 via assigned fastening elements 282, e.g., rivets or screws. Illustratively, base member 215 forms an inner hollow space 216 which is provided with an inner annular shoulder 291 and in which drive shaft 268 engages, and has an outer circumference 245 at which a locking sleeve 240 is disposed that is displaceable axially against a spring force of a spring element 244. This locking sleeve 240 is preloaded by spring element 244 in an axial direction that points away from angle attachment 200, and that, upon mounting angle attachment 200 on hand-held machine tool 100 of FIG. 1, points in the direction of hand-held machine tool 100 and thus corresponds to direction 299 of FIG. 1. To that end, spring element 244 is disposed between a clamping ring 214, formed by locking sleeve 240, for example, which may also be implemented as a separate component, and a retaining disk 219 situated in an annular groove 218 on base member 215. Moreover, in an inner annular groove 213 of locking sleeve 240, illustratively an O-ring 217, blocked in direction 299, is disposed at retaining disk 219 in order to prevent locking sleeve 240 from slipping from base member 215 because of a spring force applied by spring element 244.

However, it is pointed out that the description of spring-loaded locking sleeve 240 has only an exemplary character and is not to be understood as a restriction of the invention. Alternatively, locking sleeve 240 may also be twistable, for example, so that it is possible to dispense with a spring loading.

According to one specific embodiment, locking section 202 is able to be locked on mounting interface 150 of hand-held machine tool 100 of FIG. 1 via at least one and preferably a plurality of locking elements 232, the plurality of locking elements 232 being lockable in an assigned locking position on mounting interface 150 of FIG. 1 by locking sleeve 240. According to one specific embodiment, these locking elements 232 are designed, by interaction with mounting interface 150 of FIG. 1 in the longitudinal direction of mounting interface 150, to permit at least an axial centering that is protected against twisting, as well as an at least essentially tangentially and radially zero-play fixation of angle attachment 200 on housing 110 of hand-held machine tool 100 of FIG. 1. Preferably, the plurality of locking elements 232 have at least one locking sphere 231 engaging at least sectionally in an assigned radial opening 233 in base member 215.

Figure 3:
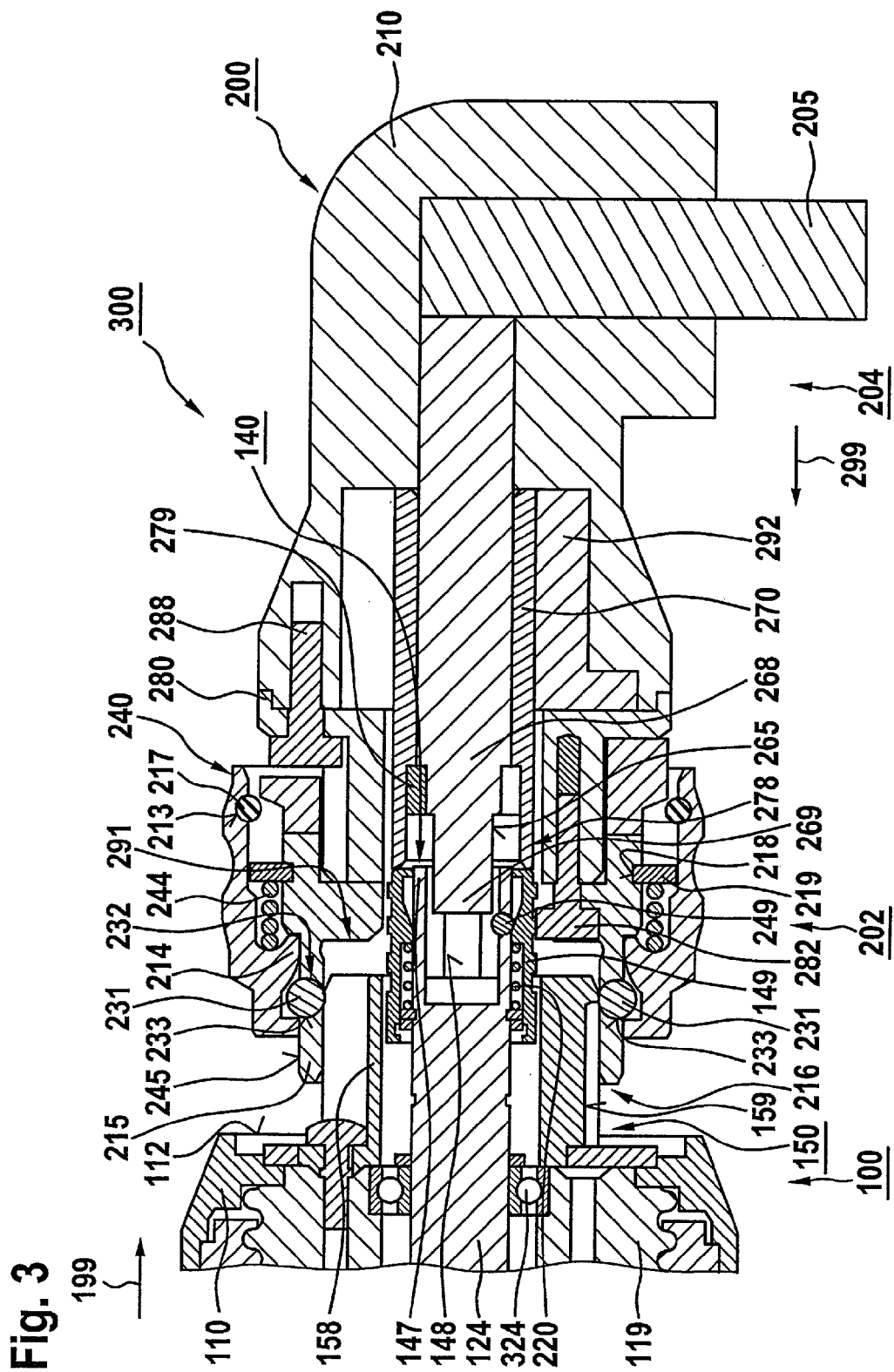
FIG. 3 shows a sectional view of a tool system according to a first specific embodiment having the hand-held machine tool of FIG. 1 and the tool attachment of FIG. 2 in the context of an exemplary mounting of the tool attachment on the hand-held machine tool.

FIG. 3 shows a first specific embodiment of a tool system 300 which, for example, has hand-held machine tool 100 of FIG. 1 and angle attachment 200 of FIG. 2, to illustrate an exemplary mounting of angle attachment 200 on hand-held machine tool 100. It is shown only sectionally here with the aid of a cut-away portion of housing 110 of FIG. 1, at whose end face 112, mounting interface 150 of FIG. 1 is disposed. It is secured preferably on gear housing 119, in which drive shaft 124 is rotationally mounted in an illustrative rolling-contact bearing 324, tool holder 140 of FIG. 1 being located on drive shaft 124.

In order to mount angle attachment 200 on mounting interface 150 of hand-held machine tool 100, in a first step, locking sleeve 240 of angle attachment 200 is shifted from its locking position, against the spring force of spring element 244, in direction 199 into its release position, so that locking spheres 231 of angle attachment 200 are released. In a further step, angle attachment 200 is then positioned on mounting interface 150 in such a way that base member 215 rests on outer circumference 159 of mounting sleeve 158 and free end 269 of drive shaft 268 of angle attachment 200 engages in inner multi-edge receiver 148 of tool holder 140, while its actuating element 270 is brought with its free end 278 in contact with locking sleeve 149 of tool holder 140 which, for example, acts radially inwards on assigned locking spheres 249, locking spheres 249 preventing an unhindered insertion of drive shaft 268 into inner multi-edge receiver 148. In this context, locking sleeve 149 is spring-loaded by a spring element 220 in axial direction 199 pointing away from hand-held machine tool 100, so that during the mounting of angle attachment 200 on hand-held machine tool 100, the spring forces of spring elements 244, 220 act in mutually opposite directions.

In a further step, angle attachment 200 is now pushed in the direction of hand-held machine tool 100, that is, in direction 299, onto mounting interface 150, e.g., until inner annular shoulder 291 of base member 215 comes to rest against mounting sleeve 158. Meanwhile, locking sleeve 149 of tool holder 140 is shifted by actuating element 270 of angle attachment 200, against a spring force applied by spring element 220, into direction 299, so that locking spheres 231 of angle attachment 200 are able to engage in groove-like receivers (152, 154, 156, 157 in FIG. 2), provided to receive locking spheres 231, in mounting sleeve 158, and free end 269 of drive shaft 268 is pushed into inner multi-edge receiver 148. Tool attachment 200 is thus able to be mounted on hand-held machine tool 100 using one hand, drive shaft 268 being accommodated in inner multi-edge receiver 148 of receiving member 147 of tool holder 140 with tangential and axial play, and preferably exclusively for transferring torque.

Locking sleeve 240 of angle attachment 200, and thus entire angle attachment 200, is subsequently released, whereupon locking sleeve 240 is shifted by the spring force of spring element 244 in direction 199 back into its locking position in which locking sleeve 240 blocks or prevents the radially outwards-directed movement of locking spheres 231. At the same time, because of the spring force of spring element 220, actuating element 270 is acted upon by locking sleeve 149 of tool holder 140 in direction 199, so that an axial shift of entire angle attachment 200 in direction 199 is obtained by force. Thus, according to one specific embodiment, actuating element 270 is designed to permit spring loading of angle attachment 200 by spring element 220 via first locking sleeve 149 in the mounted state of angle attachment 200 on hand-held machine tool 100, in direction 199.

Due to the axial shift of entire angle attachment 200 in direction 199, locking spheres 231 of angle attachment 200 are pressed into V-shaped end areas 153 of groove-like receivers (152, 154, 156, 157 in FIG. 2) of mounting sleeve 158, so that interaction of mounting sleeve 158 or mounting interface 150 with locking spheres 231 or locking elements 232 in the longitudinal direction of mounting interface 150 permits at least an axial centering protected against twisting, as well as an at least substantially tangentially and radially zero-play fixation of angle attachment 200 on housing 110 and/or gear housing 119 of hand-held machine tool 100.

Figure 4:
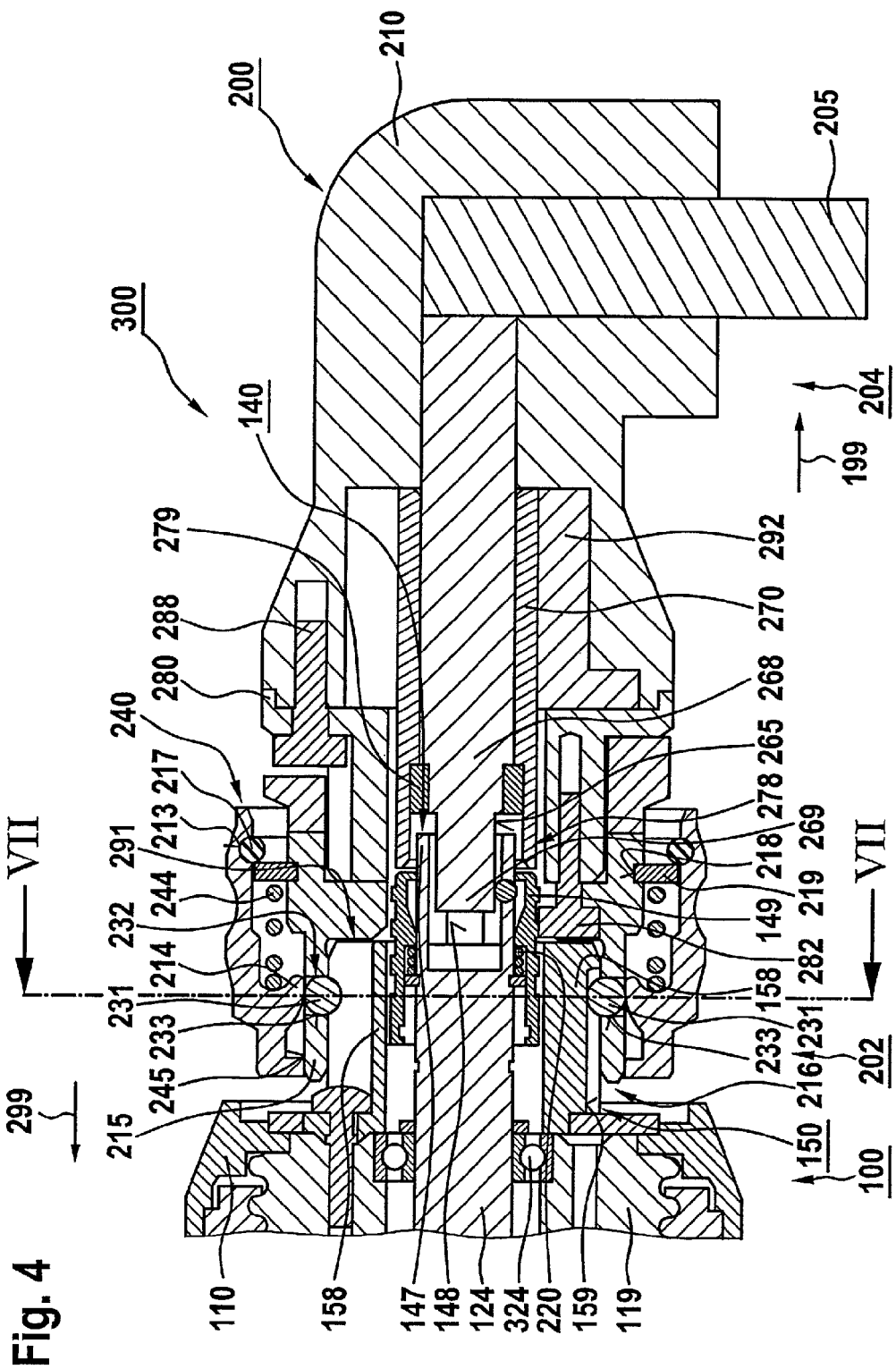
FIG. 4 shows the sectional view of the tool system of FIG. 3 having the tool attachment mounted on the hand-held machine tool.

FIG. 4 shows tool system 300 of FIG. 3 having hand-held machine tool 100 of FIG. 1 and angle attachment 200 of FIG. 2 in the assembled state. FIG. 4 clarifies the spring loading of actuating element 270 of angle attachment 200 by locking sleeve 149 of tool holder 140 of hand-held machine tool 100.

Figure 5:
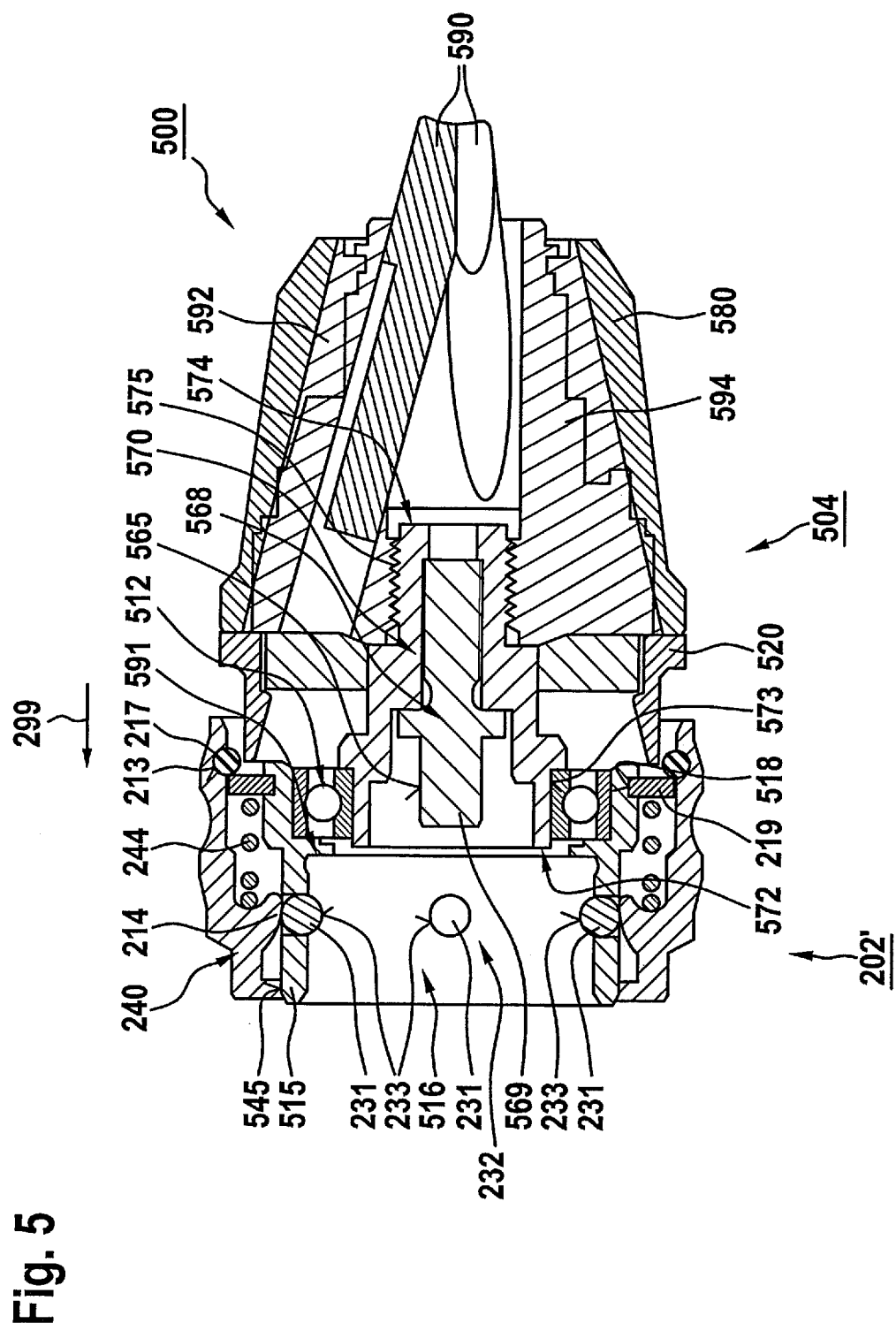
FIG. 5 shows a sectional view of a tool attachment according to a second specific embodiment.

FIG. 5 shows a tool attachment 500 which is likewise provided for mounting on mounting interface 150 of hand-held machine tool 100 of FIG. 1, and which according to a second specific embodiment, is formed in the manner of a drill-chuck adapter and, for example, has a locking section 202' as well as a clamping-chuck section 504. To simplify the description, tool attachment 500 is therefore also denoted hereinafter as "drill-chuck attachment 500."

By way of example, clamping-chuck section 504 has a supporting member 594, on which a plurality of clamping jaws 590 are supported, which are able to be actuated via a clamping member 592, provided with a clamping sleeve 580, in order to chuck an assigned insert tool, e.g., a round drill. For example, supporting member 594 is fastened in a manner protected against twisting via a screw connection 575 to a first axial end area 574 of an actuating element 570 assigned to locking section 202', so that in response to a rotational motion of actuating element 570, supporting member 594 rotates with it. Alternatively, supporting member 594 may also be joined to actuating element 570 by a press-fit connection, for example, or perhaps may be formed in one piece with it. Illustratively, a drive shaft 568 is accommodated in a manner protected against twisting in at least sectionally sleeve-shaped actuating element 570, so that in response to a rotational motion of drive shaft 568, actuating element 570 rotates with it. Alternatively, drive shaft 568 and actuating element 570 may also be formed in one piece.

A multi-edge entrainment contour 565 is formed at a free axial end 569 of drive shaft 568, the free axial end exemplarily being accommodated in a second axial end area 572 of actuating element 570. A periphery 573 of second axial end area 572 of actuating element 570 is rotationally mounted in a bearing element 512 assigned to locking section 202', e.g., a rolling-contact bearing formed in the manner of a radial bearing, or preferably is pressed into it. However, it is pointed out that a suitable implementation of clamping-chuck section 504 is sufficiently familiar from the related art, so that a detailed description of clamping-chuck section 504 may be omitted here in order to keep the specification concise.

By way of example, locking section 202' has a base member 515, which illustratively forms an inner hollow space that is provided with an inner annular shoulder 591 and in which drive shaft 568 engages, bearing element 512 being disposed in the area of annular shoulder 591, for example, and preferably being pressed in or retained there by retaining rings or spring rings, for instance. A cover sleeve 520, for example, is disposed in the area between base member 515 and supporting member 594 of clamping-chuck section 504.

As example, base member 515 has an outer circumference 545, at which illustratively locking sleeve 240 of FIG. 2, axially displaceable against the spring force of spring element 244, is disposed. This locking sleeve 240 is preloaded by spring element 244 in an axial direction pointing away from drill-chuck attachment 500, i.e., direction 299 of FIG. 1. To that end, spring element 244 is disposed between clamping ring 214 of FIG. 2, formed by locking sleeve 240, for example, and retaining disk 219 located in an annular groove 518 on base member 515.

The further construction of locking section 202' corresponds to the construction of locking section 202 of FIG. 2, so that a detailed description of this further construction may be omitted here for the purpose of keeping the specification concise. Moreover, it is pointed out that the functioning method of locking section 202' corresponds to the functioning method of locking section 202 of FIG. 2, so that a detailed description of this functioning method may also be omitted here, so as to keep the specification brief.

Figure 6:
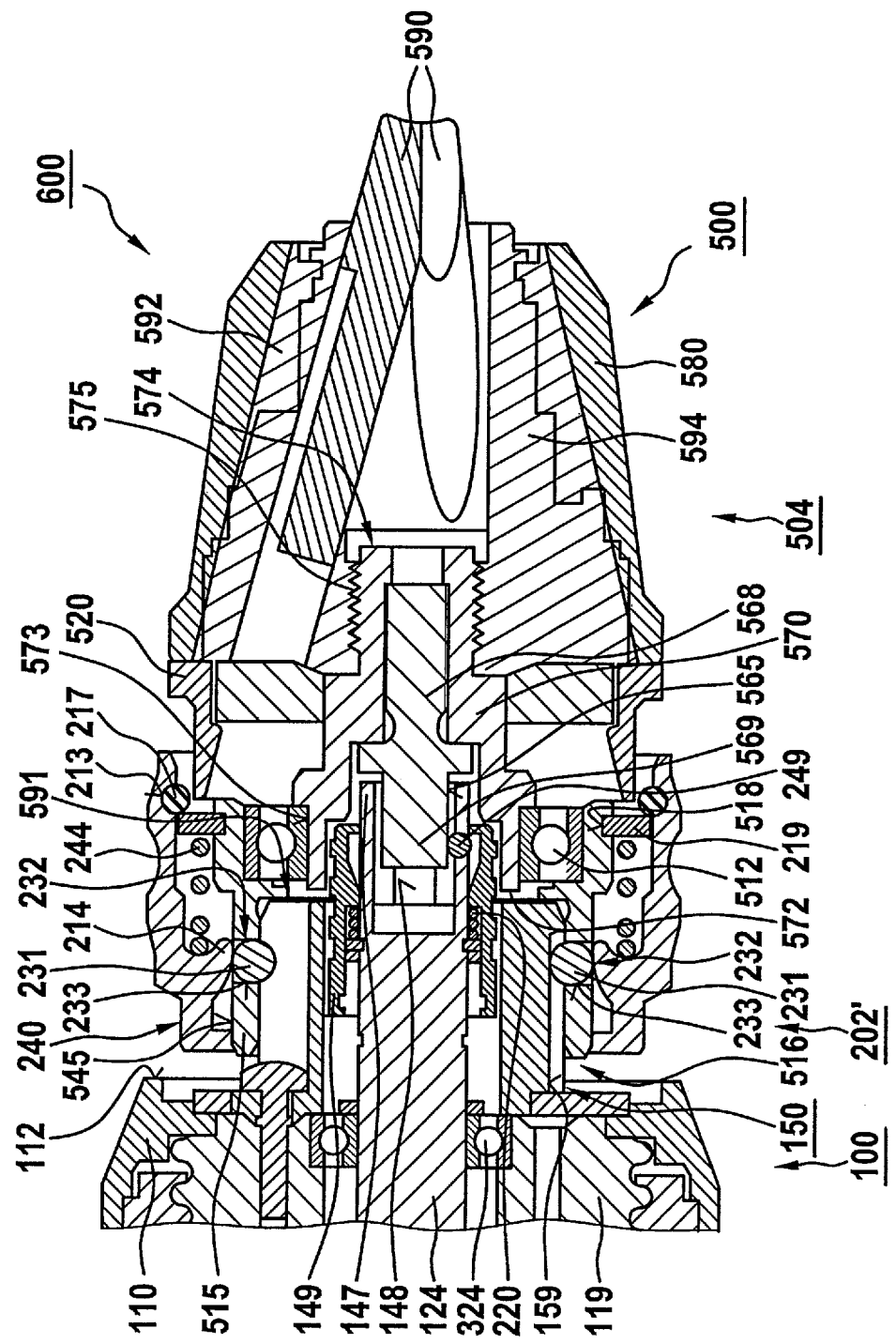
FIG. 6 shows a sectional view of a tool system according to a second specific embodiment having the tool attachment of FIG. 5 mounted on the hand-held machine tool of FIG. 1.

FIG. 6 shows a second specific embodiment of a tool system 600 that, for example, has hand-held machine tool 100 of FIG. 1, illustrated with the aid of the cut-away portion of FIGS. 3 and 4, and drill-chuck attachment 500 of FIG. 5. In this case, tool system 600 is shown in the assembled state. Drill-chuck attachment 500 is mounted on hand-held machine tool 100 analogously to the mounting described above in connection with FIG. 3 using tool system 300 as example, so that in order to keep the specification concise, a detailed description of the mounting is omitted here.

Figure 7:
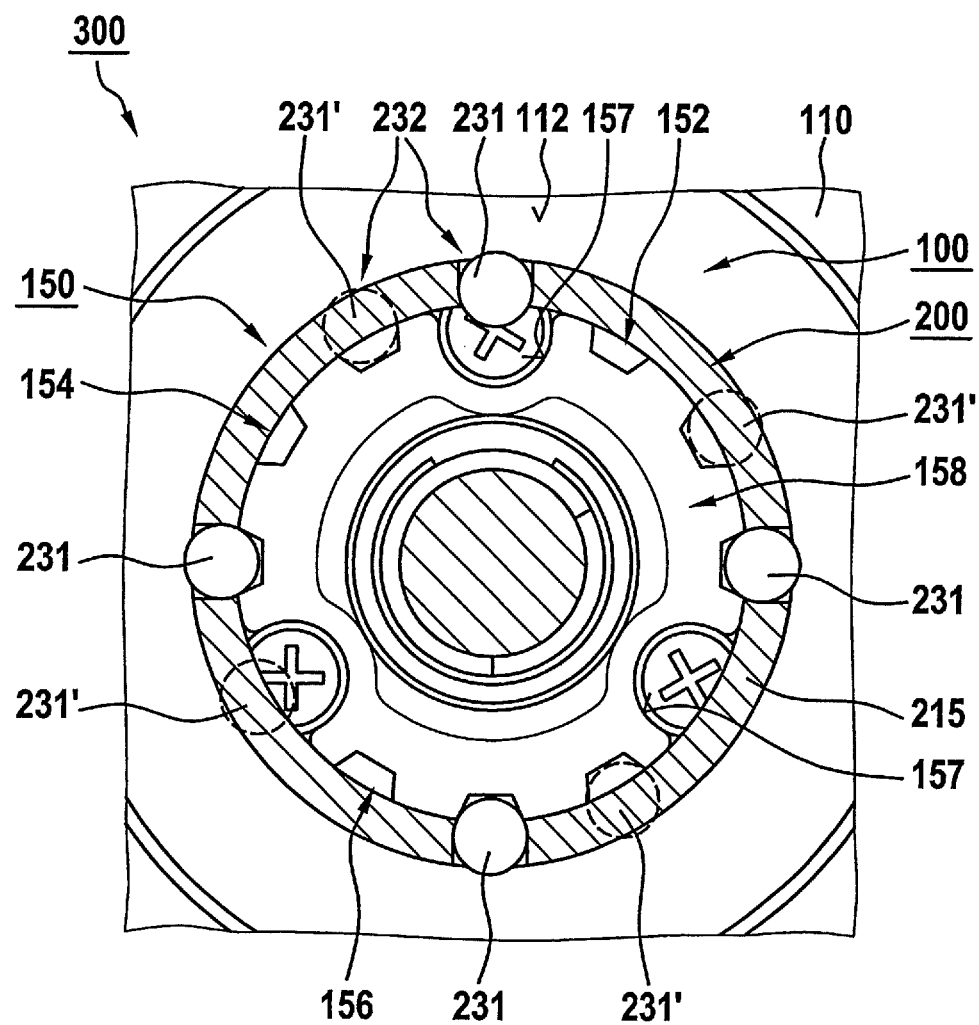
FIG. 7 shows a sectional view of the tool system of FIG. 4, viewed in the direction of arrows VII-VII from FIG. 4.

FIG. 7 shows tool system 300 of FIG. 4 having hand-held machine tool 100 of FIG. 1 and angle attachment 200 of FIG. 2, fastened to its housing 110, in the assembled state, in each case one of locking spheres 231 engaging in one of respective groove-like receivers 152, 154, 156, 157 of mounting interface 150. In this case, for example, angle attachment 200 is oriented in a predefined angular position in which, for instance, drive shaft 205 of FIG. 3 of angle attachment 200 is aligned parallel to the longitudinal direction of hand grip 126 of FIG. 1 of hand-held machine tool 100.

According to one specific embodiment, the predefined angular position may be changed as described in the following, without removing angle attachment 200 from mounting interface 150. To that end, locking sleeve 240 in FIG. 4 is shifted in the direction of arrow 199 into the release position described in connection with FIG. 3, however without an axial shift of angle attachment 200. Due to this shift of locking sleeve 240 into the release position, locking spheres 231 are released and, in response to a twisting of angle attachment 200, are able to slip out of respective groove-like receivers 152, 154, 156, 157, and are transferred into other groove-like receivers 152, 154, 156, 157. If, in the process, locking spheres 231 are transferred into the positions denoted by 231', e.g., by twisting tool attachment 200 in FIG. 7 in the clockwise direction, this corresponds to a twisting of angle attachment 200 by approximately 60°. Angle attachment 200 may subsequently be locked in its new angular position by once more releasing locking sleeve 240 of FIG. 4, as described in connection with FIG. 3.

However, it is pointed out that the change in the predefined angular position was described merely by way of example with reference to tool system 300 of FIG. 3. In the case of tool system 600 of FIG. 6, the angular position could be changed in analogous manner. However, because of its axial symmetry, the angular position of drill-chuck attachment 500 is irrelevant in the operation of tool system 600 of FIG. 6. With that said, a multitude of angular positions in which drill-chuck attachment 500 in tool system 600 of FIG. 6 is able to be joined to hand-held machine tool 100 of FIG. 1, given a corresponding assembly, are nevertheless obtained, so that rapid and simple mounting is possible, regardless of a specific angular position.

Figure 8:
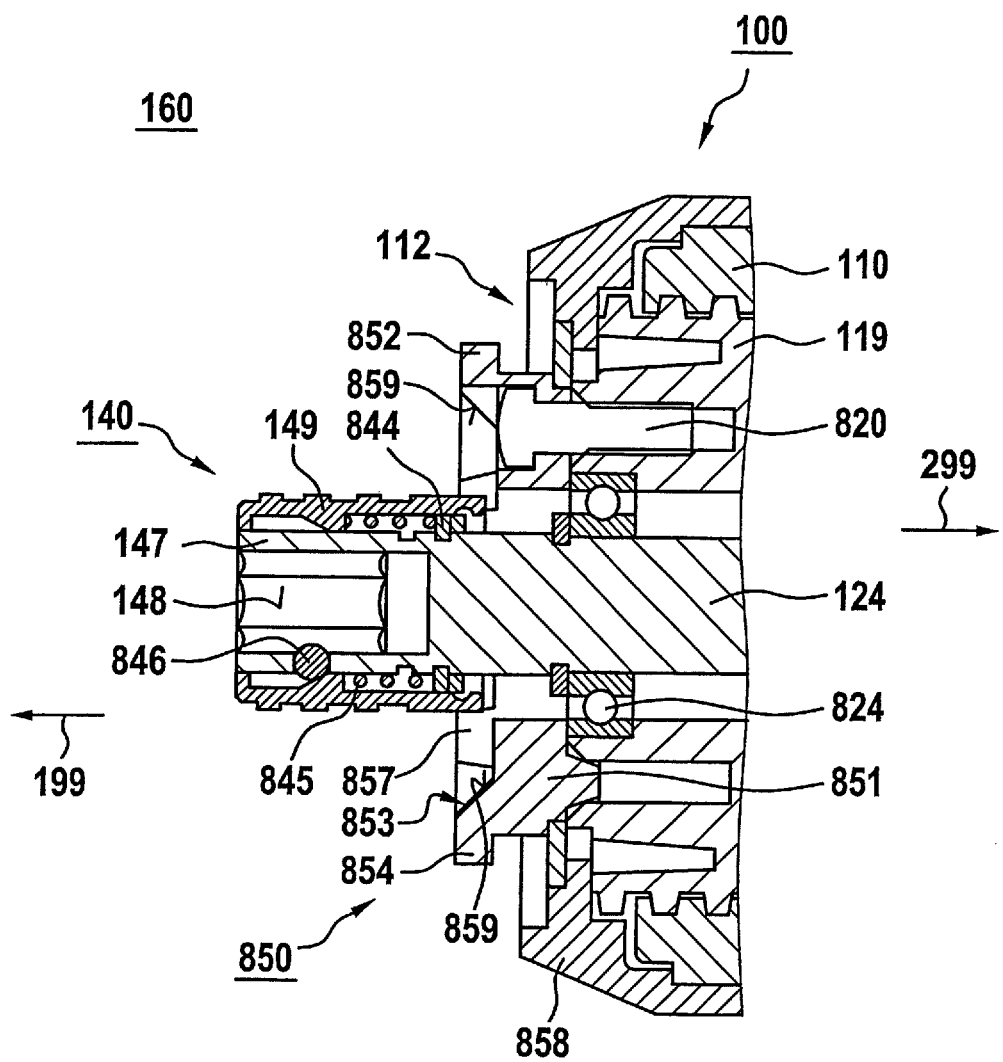
FIG. 8 shows a sectional view of a cut-away portion of the hand-held machine tool of FIG. 1 having a mounting interface according to an alternative specific embodiment.

FIG. 8 shows cut-away portion 160 of hand-held machine tool 100 of FIG. 1 in a sectional view, having bit holder 140 as well as a mounting interface 850, likewise denoted hereinafter as "machine interface", according to an alternative specific embodiment. As described in connection with FIG. 1, bit holder 140 is formed in the area of end face 112 of housing 110 on drive shaft 124 of FIG. 1, which, for example, is rotationally mounted in a bearing element 824, e.g., a rolling-contact bearing, situated in housing 110, preferably in gear housing 119, of hand-held machine tool 100.

Bit holder 140 has receiving member 147 having inner multi-edge receiver 148 and locking sleeve 149 of FIG. 1. For example, locking sleeve 149 is used to act radially on at least one locking element 846, e.g., a locking sphere, and is spring-loaded by an assigned spring element 845, which is braced against a retaining ring 844 held on drive shaft 124, in axial direction 199 of FIG. 1 pointing away from hand-held machine tool 100. To release tool holder 140, locking sleeve 149 must be shifted against a spring force applied by spring element 845, into the direction of end face 112, thus permitting the at least one locking sphere 846 to move radially outwards.

Illustratively, machine interface 850 is secured in axially and radially immovable fashion in the area of bit holder 140 on gear housing 119 or directly on housing 110 and, by way of example, is formed as a separate component, but alternatively, may also be formed in one piece with gear housing 119 or housing 110. Machine interface 850 is used preferably for mounting an assigned tool attachment (950 in FIG. 9), e.g., a drill-chuck attachment, an angle attachment or an eccentric attachment, etc., so as to be protected against twisting, and illustratively, has a mounting element 851 secured at end face 112 of housing 110 on gear housing 119 or housing 110 in a manner protected against twisting by fastening components 820 formed, for example, in the manner of screws. For instance, mounting element 851 is at least sectionally sleeve-shaped or ring-shaped, and is secured in the area of a terminal or protective sleeve 858, disposed annularly at end face 112 on housing 110, using suitable fastening components, e.g., screws or rivets, but as an alternative, may also be formed in one piece with gear housing 119 or housing 110. Preferably, mounting element 851 jackets bit holder 140 at least sectionally with a predefined radial clearance in order to permit an axial shift of locking sleeve 149 of bit holder 140 in the interior of mounting element 851.

As illustration, at its outer circumference, mounting element 851 has at least one, and illustratively two holding elements 852, 854, which are formed in the manner of bayonets in order to produce a bayonet joint. However, it is pointed out that the description of such a bayonet joint has only an exemplary character, and does not serve as a restriction of the invention. Rather, alternative fastening possibilities may also be used in the case of machine interface 850, such as what is termed a wire-strap locking or a spherical locking, etc.

Figure 9:
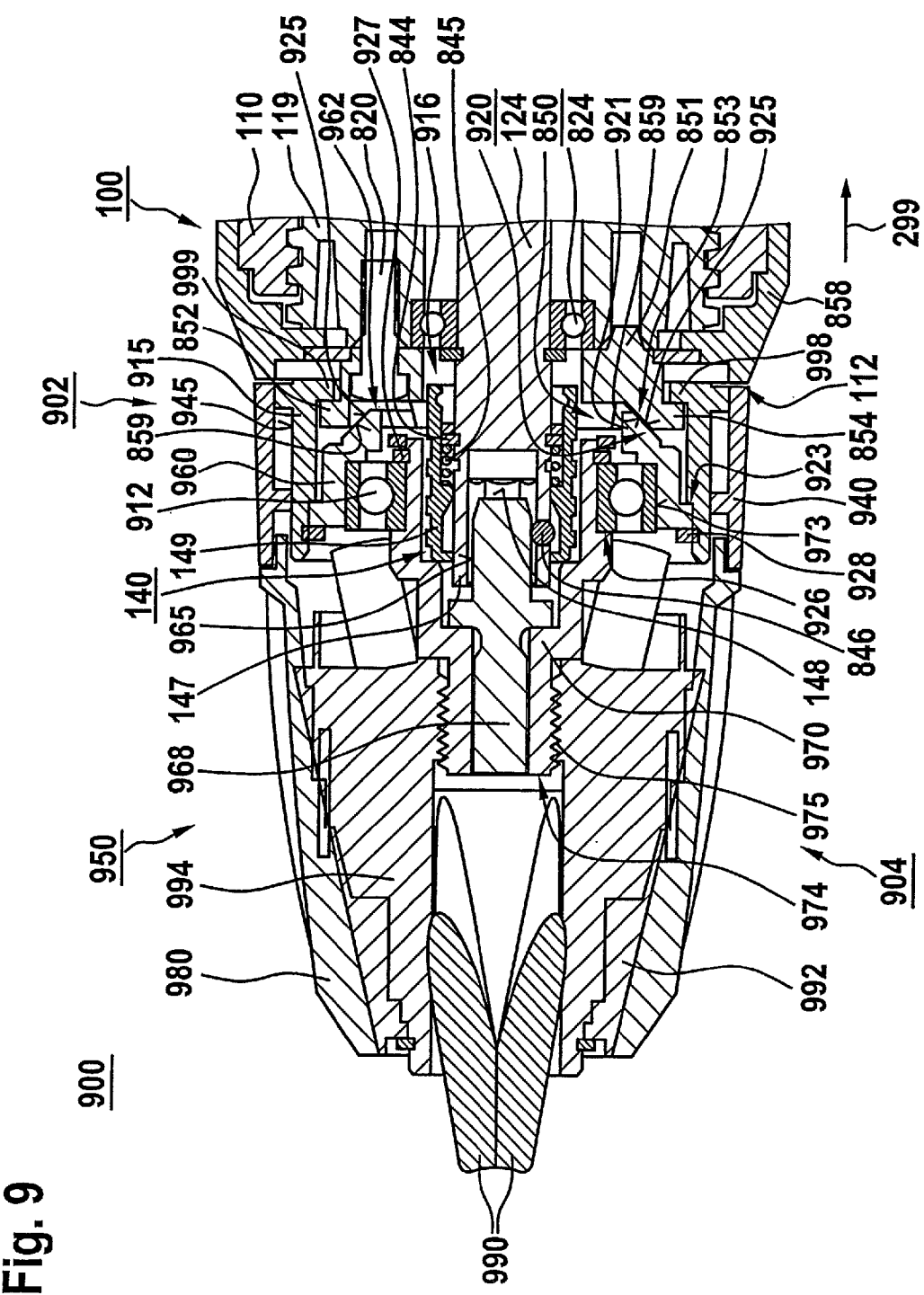
FIG. 9 shows a sectional view of a tool system according to a third specific embodiment having a tool attachment mounted on the mounting interface of FIG. 8.

According to one specific embodiment, on machine interface 850, an at least sectionally conical centering aid 853 is provided for the axial centering of a locking section (902 in FIG. 9) of an assigned tool attachment (950 in FIG. 9). Illustratively, mounting element 851 is designed to permit the axial centering of the assigned tool attachment (950 in FIG. 9) on gear housing 119 and/or housing 110, as described below in connection with FIG. 9. To that end, at the inner circumference of mounting element 851, an exemplary annular, at least sectionally funnel-shaped centering surface 859 is provided for forming centering aid 853.

However, it is pointed out that centering surface 859 is funnel-shaped only by way of example, and not as a restriction of the invention. Rather, a tapered form may also be realized on an additional centering ring. Accordingly, a reference to the term "conical" within the context of the present invention represents a reference both to a tapered and to a funnel-shaped form of a corresponding component. Moreover, instead of a single annular and funnel-shaped centering surface 859, centering aid 853 may have a plurality of conical curved sections, etc.

In addition, mounting element 851 has at least one and, exemplarily, three optional angular-adjustment elements 857. For instance, they are used for the setting of a predefined angular position when mounting tool attachment (950 in FIG. 9) on machine interface 850.

FIG. 9 shows an exemplary tool system 900, which illustratively has hand-held machine tool 100 of FIG. 1 and an exemplary tool attachment 950. In this case, hand-held machine tool 100 is shown only sectionally with the aid of the cut-away portion of gear housing 119 or of housing 110 of FIG. 8, at whose end face 112 machine interface 850 of FIG. 8 is disposed, and in which drive shaft 124 is rotationally mounted in illustrative rolling-contact bearing 824 of FIG. 8, tool holder 140 of FIG. 8 being situated on drive shaft 124.

According to one specific embodiment, tool attachment 950 is designed for mounting on machine interface 850 of hand-held machine tool 100 in a manner protected against twisting. Preferably, tool attachment 950 takes the form of a drill-chuck attachment, and therefore is also denoted hereinafter as "drill-chuck attachment 950." However, it is pointed out that tool attachment 950 is formed as a drill-chuck attachment only by way of example, and not to restrict the invention. Rather, tool attachment 950 may have any form as desired, e.g., a type of angle attachment, eccentric attachment, etc., which, as described above, are likewise able to be mounted on machine interface 850 of hand-held machine tool 100 in a manner protected against twisting.

By way of example, drill-chuck attachment 950 has a locking section 902 as well as a clamping-chuck unit 904. Clamping-chuck unit 904 has a supporting member 994, for example, on which a plurality of clamping jaws 990 are supported, which are able to be actuated via a clamping member 992, provided with a clamping sleeve 980, in order to clamp an assigned insert tool, e.g., a round drill. For example, supporting member 994 is fastened in a manner protected against twisting via a screw connection 975 to a first axial end area 974 of an actuating element 970 assigned to locking section 902, so that in response to a rotational motion of actuating element 970, supporting member 994 rotates with it. Alternatively, supporting member 994 may also be joined to actuating element 970 by a press-fit connection, for example, or perhaps be formed in one piece with it. Illustratively, a drive shaft 968 is accommodated in a manner protected against twisting in at least sectionally sleeve-shaped actuating element 970, so that in response to a rotational motion of drive shaft 968, actuating element 970 rotates with it. Alternatively, drive shaft 968 and actuating element 970 may also be formed in one piece.

A multi-edge entrainment contour 965 is formed at a free axial end of drive shaft 968, the free axial end exemplarily being accommodated in a second axial end area of actuating element 970. A periphery of the second axial end area of actuating element 970 is rotationally mounted in a bearing element 912 assigned to locking section 902, e.g., in a rolling-contact bearing formed in the manner of a radial bearing, or preferably is pressed into it, so that clamping-chuck unit 904 is rotationally mounted on locking section 902. In this context, bearing element 912 is fixed axially in position in the axial direction of actuating element 970 between an annular shoulder 926 formed on it and a retaining ring 927 secured to it. However, it is pointed out that a suitable implementation of clamping-chuck unit 904 is sufficiently familiar from the related art, so that a detailed description of clamping-chuck unit 904 may be omitted here so as to keep the specification concise.

Locking section 902 is designed for mounting and locking on machine interface 850 of hand-held machine tool 100 in a manner protected against twisting and, for example, has a base member 915, at whose outer circumference at least two holding elements 998, 999 are provided which, for instance, are formed in the manner of bayonets in order to produce a bayonet joint with bayonets 852, 854 of machine interface 850. Base member 915 forms an interior space 916 and has an outer circumference 945, at which illustratively an actuating and locking sleeve 940 is disposed. Moreover, base member 915 illustratively has an inner annular shoulder 923 and an inner retaining ring 928 secured to its inner circumference, a centering element 960, for example, being fixed axially in position in the area between annular shoulder 923 and retaining ring 928. Alternatively, this centering element 960 may also be formed in one piece with base member 915, or integrally molded on it. For example, bearing element 912 is disposed and preferably pressed in at inner circumference 973 of centering element 960.

According to one specific embodiment, complementary geometrical shapes are provided on locking section 902 and machine interface 850 of hand-held machine tool 100, the shapes being designed to mesh in order to axially center locking section 902 on machine interface 850. These complementary geometrical shapes are configured to produce a form-locking connection in the axial direction of locking section 902. Therefore, complementary geometrical shapes within the context of the present invention are to be understood quite generally as geometrical shapes which are able to be joined together to produce a form-locking connection.

Illustratively, centering element 960 of locking section 902 has at least one centering aid 920 which is at least sectionally conical. It is provided to engage with at least sectionally funnel-shaped centering aid 853, provided on machine interface 850 of hand-held machine tool 100, and preferably is formed at least sectionally in the manner of a ring 921 having an outer circumference 925, beveled at least in some areas, at an axial end area 962 of locking section 902. Alternatively, instead of ring 921, for example, centering aid 920 may have a plurality of conical curved sections, etc.

In order to mount drill-chuck attachment 950 on machine interface 850 of hand-held machine tool 100, drill-chuck attachment 950 is brought in direction 299 of FIG. 8 toward machine interface 850 and positioned on it in such a way that actuating element 970 is brought into contact with locking sleeve 149 of tool holder 140 of hand-held machine tool 100, so that the free end of drive shaft 968 engages at least sectionally in empty inner multi-edge receiver 148 of tool holder 140, and is prevented from a complete engagement by the at least one locking sphere 846 of FIG. 8. This locking sphere 846, or other suitable locking elements, are acted upon radially inwards by locking sleeve 149 of tool holder 140 in a manner familiar to one skilled in the art, for example, to thus prevent an unhindered insertion of drive shaft 968 into inner multi-edge receiver 148.

In a further step, drill-chuck attachment 950 is now slid in direction 299 onto machine interface 850, e.g., until base member 915 abuts against mounting element 851 of machine interface 850, so that by rotating actuating and locking sleeve 940, bayonets 998, 999 provided on base member 915 are able to be brought into engagement with bayonets 852, 854 of mounting element 851, and thus locked on them, so that locking section 902 is detachably secured and locked on machine interface 850.

Moreover, in the process, at least sectionally conical centering aid 920 of locking section 902 is brought into contact with at least sectionally funnel-shaped centering aid 853 of machine interface 850. Thus, secure and reliable axial centering of drill-chuck attachment 950 on machine interface 850 of hand-held machine tool 100 may be rendered possible.

However, it is pointed out again that centering aids 920 and 853 are conical only by way of example and not to restrict the invention. Rather, as described above, they only have to have suitable complementary geographical shapes in order to produce a form-locking connection. Accordingly, centering aid 853 of machine interface 850 may be funnel-shaped, for instance, as shown in FIGS. 8 and 9, while centering aid 920 of drill-chuck attachment 950 is cylindrical or ring-shaped, for example. Alternatively, as described above, centering aid 920 of drill-chuck attachment 950 may be conical, i.e., tapered or funnel-shaped, for example, while centering aid 853 of machine interface 850 is cylindrical or ring-shaped, etc.

What is claimed is:

1. A tool attachment, comprising:
a drive shaft configured to be driven rotationally;
a locking section for locking on a mounting interface of a hand-held machine tool, the machine tool including a tool holder having a receiving member for receiving an insert tool and a first locking sleeve preloaded by a first spring element in an axial direction pointing away from the hand-held machine tool; and
an actuating element coupled with the drive shaft and configured to shift, in a self-actuating manner upon mounting the tool attachment on the hand-held machine tool, the first locking sleeve against a spring force applied by the first spring element, in the direction of the hand-held machine tool.

2. The tool attachment as recited in claim 1, wherein the actuating element surrounds the drive shaft at least sectionally in sleeve-shaped fashion.

3. A tool attachment, comprising:
a drive shaft configured to be driven rotationally;
a locking section for locking on a mounting interface of a hand-held machine tool, the machine tool including a tool holder having a receiving member for receiving an insert tool and a first locking sleeve preloaded by a first spring element in an axial direction pointing away from the hand-held machine tool; and
an actuating element configured to shift, upon mounting the tool attachment on the hand-held machine tool, the first locking sleeve against a spring force applied by the first spring element, in the direction of the hand-held machine tool,
wherein the actuating element surrounds the drive shaft at least sectionally in sleeve-shaped fashion,
wherein the drive shaft and the actuating element are formed in one piece.

4. The tool attachment as recited in claim 2, wherein:
the drive shaft is rotationally mounted in a base member forming an inner hollow space;
the base member has an outer circumference at which a second locking sleeve is disposed;
the second locking sleeve is axially displaceable against a spring force of a second spring element in order to release at least one locking element;
the second locking sleeve is preloaded by the second spring element in an axial direction which (i) points away from the tool attachment, and (ii) upon mounting the tool attachment on the hand-held machine tool, points in the direction of the hand-held machine tool.

5. The tool attachment as recited in claim 4, wherein upon mounting the tool attachment on the hand-held machine tool, the resultant spring forces of the first and second spring elements act in mutually opposite directions.

6. The tool attachment as recited in claim 4, wherein the at least one locking element has at least one locking sphere engaging at least sectionally in an assigned radial opening in the base member.

7. The tool attachment as recited in claim 1, wherein the actuating element is configured to enable spring loading of the tool attachment by the first spring element via the first locking sleeve in the mounted state of the tool attachment on the hand-held machine tool, in the axial direction pointing away from the hand-held machine tool.

8. The tool attachment as recited in claim 1, wherein the drive shaft is accommodated in the receiving member exclusively for transferring torque.

9. The tool attachment as recited in claim 1, wherein the tool attachment is configured as one of a drill-chuck adapter or an angle attachment.

10. The tool attachment as recited claim 1, wherein the locking section has at least one holding element formed in the manner of a bayonet for mounting and locking on the mounting interface of the hand-held machine tool in a manner protected against twisting.

11. A tool system, comprising:
a hand-held machine tool; and
a tool attachment for mounting on the hand-held machine tool,
wherein the hand-held machine tool includes:
a tool holder having a receiving member for receiving an insert tool and a first locking sleeve preloaded by a first spring element in an axial direction pointing away from the hand-held machine tool, and
a mounting interface for mounting the tool attachment on the hand-held machine tool, and
wherein the tool attachment includes:
a drive shaft configured to be driven rotationally;
a locking section for locking on the mounting interface; and
an actuating element coupled with the drive shaft and configured to shift, in a self-actuating manner upon mounting the tool attachment on the hand-held machine tool, the first locking sleeve against a spring force applied by the first spring element, in the direction of the hand-held machine tool.

12. The tool system of claim 11, wherein the tool attachment is configured as a drill-chuck adapter.

13. The tool system of claim 11, wherein the tool attachment is configured as an angle attachment.

14. The tool system of claim 11, wherein the tool attachment is configured as an eccentric attachment.

15. The tool system of claim 11, wherein the tool attachment is configured as one of a drill-chuck adapter, an angle attachment, and an eccentric attachment, and wherein the mounting interface is configured to mount at least one of the drill-chuck adapter, the angle attachment, and the eccentric attachment.

16. The tool attachment of claim 1, wherein the tool attachment is configured as a drill-chuck adapter.

17. The tool attachment of claim 1, wherein the tool attachment is configured as an angle attachment.

18. The tool attachment of claim 1, wherein the tool attachment is configured as an eccentric attachment.

19. The tool attachment of claim 1, wherein the tool attachment is configured as one of a drill-chuck adapter, an angle attachment, and an eccentric attachment.

20. A hand-held machine tool, comprising:
a drive shaft;
a tool holder formed on the drive shaft and having (i) a receiving member for receiving an insert tool, and (ii) a first locking sleeve preloaded by a first spring element in an axial direction pointing away from the hand-held machine tool; and
a mounting interface configured to mount a tool attachment on the hand-held machine tool, wherein, upon mounting the tool attachment on the hand-held machine tool, an actuating element of the tool attachment coupled with the drive shaft and is configured to shift in a self-actuating manner the first locking sleeve against a spring force applied by the first spring element in a direction of the hand-held machine tool.

21. The tool attachment as recited in claim 1, wherein the drive shaft and the actuating element are formed in one piece.

22. The tool attachment as recited in claim 1, wherein the actuating element is secured to the drive shaft at least partially via a retaining ring or a plain bearing.

23. The tool attachment as recited in claim 1, wherein a free end of the drive shaft is configured to engage in the receiving member of the tool holder of the hand-held machine tool.

24. The tool attachment as recited in claim 1, wherein the actuating element is rotatably supported in a housing of the tool attachment.

25. The tool attachment as recited in claim 1, wherein the actuating element is rotatably supported in a base member of the tool attachment.

26. The tool attachment as recited in claim 1, wherein the actuating element is coupled with the drive shaft in a manner fixed against rotation.

27. The tool attachment as recited in claim 1, wherein the actuating element is rotatably coupled with the drive shaft.

28. The tool attachment as recited in claim 1, wherein the locking section includes a base member and a second locking sleeve which is disposed on an outer circumference of the base member.

29. The tool attachment as recited in claim 28, wherein the second locking sleeve is axially displaceable against a spring force of a second spring element in order to release at least one locking element.

30. The tool attachment as recited in claim 28, wherein the second locking sleeve is rotatably displaceable relative to the base member.

31. The tool attachment as recited in claim 28, wherein the actuating element is rotatably supported in the base member of the locking section.

32. The tool attachment as recited in claim 1, wherein the locking section is configured for locking on a mounting interface of a hand-held machine tool in a manner fixed against rotation.

33. The tool attachment as recited in claim 1, wherein the locking section includes a base member having at least one holding element configured to be releasably connected to the mounting interface of the hand-held machine tool.

34. The tool attachment as recited in claim 33, wherein the base member includes two holding elements embodied as bayonets configured to produce a bayonet coupling with corresponding bayonets of the mounting interface of the hand-held machine tool.

35. A tool attachment, comprising:
a drive shaft configured to be driven rotationally;
a locking section for locking on a mounting interface of a hand-held machine tool, the machine tool including a tool holder having a receiving member for receiving an insert tool and a first locking sleeve preloaded by a first spring element in an axial direction pointing away from the hand-held machine tool; and
an actuating element configured to shift, upon mounting the tool attachment on the hand-held machine tool, the first locking sleeve against a spring force applied by the first spring element, in the direction of the hand-held machine tool,
wherein:
the drive shaft and the actuating element are formed in one piece; or
the actuating element is secured to the drive shaft at least partially via a retaining ring or a plain bearing.

* * * * *